United States Patent [19]

Kinter et al.

[11] Patent Number: 5,047,921
[45] Date of Patent: Sep. 10, 1991

[54] ASYNCHRONOUS MICROPROCESSOR RANDOM ACCESS MEMORY ARBITRATION CONTROLLER

[75] Inventors: Harold B. Kinter, Binghamton; Gerald R. Westcott, Newark Valley, both of N.Y.

[73] Assignee: International Business Machines Corporation, Armonk, N.Y.

[21] Appl. No.: 304,777

[22] Filed: Jan. 31, 1989

[51] Int. Cl.$^5$ .............................................. G06F 15/16
[52] U.S. Cl. .................................... 364/200; 364/134; 364/228.1; 364/242.91; 364/270.7
[58] Field of Search ..................... 364/200, 900, 134

[56] References Cited

U.S. PATENT DOCUMENTS

| | | | |
|---|---|---|---|
| 4,121,285 | 10/1978 | Chen | 364/200 |
| 4,128,881 | 12/1978 | Yamamoto | 364/200 |
| 4,363,094 | 12/1982 | Kaul | 364/200 |
| 4,415,972 | 11/1983 | Adcock | 364/200 |
| 4,620,118 | 10/1986 | Barber | 307/514 |
| 4,665,483 | 5/1987 | Ciacci | 364/200 |
| 4,841,178 | 6/1989 | Bisson | 307/518 |

FOREIGN PATENT DOCUMENTS

| | | | |
|---|---|---|---|
| 0222367 | 12/1983 | Japan | 364/134 |
| 0091563 | 5/1984 | Japan | 364/134 |
| 0097462 | 5/1985 | Japan | 364/134 |
| 0262259 | 12/1985 | Japan | 364/134 |

Primary Examiner—Dale M. Shaw
Assistant Examiner—Andren F. Bodendorf
Attorney, Agent, or Firm—Douglas M. Clarkson

[57] ABSTRACT a system of arbitration for access to a common memory by two asynchronous microprocessors without excluding either microprocessor for more than a predetermined, limited period of time. Two asynchronous microprocessors are connected to a common memory through an arbitration controller with a connection to transmit a "not ready" signal to one microprocessor requesting access when the other is in the process of accessing the common memory. A flip flop is connected to generate a predetermined signal output when a microprocessor requires access to the common memory, and this predetermined signal initiates a shift register to provide the internal timing of the asynchronous microprocessor requiring such access to bring it into synchronism with the clock controlling the internal cycle of the common memory. When there is contention for access to the common memory, a flip flop connects one microprocessor to the common memory, where such connection is maintained only for a predetermined, limited period of time, when access is returned to the first microprocessor. Access to the common memory by any microprocessor is always for only this one, predetermined, limited period of time.

20 Claims, 8 Drawing Sheets

1. MAIN CLOCKOUT
2. TASK BUS REQUEST
3. MAIN SELECT
4. MAIN DEN
5. TASK REQUEST PENDING FF
6. TASK RAM CYCLE FF
7. SHIFT REQ.
8. TASK BUS ACK
9. MAIN DATA BUS DISABLE
10. MAIN ARDY
11. ADDRESS ENABLED
12. DATA ENABLED
13. 8K CHIP SELECT
14. 16K CHIP SELECT
15. 8K WRITE ENABLE
16. 18K WRITE ENABLE

17. CONDITION:
  • TASK — REQ. & EXECUTES CYCLE
  • MAIN — LATE REQ. & DLY'D CYCLE

18. SEQUENCE:
  1. TASK REQUEST WRITE CYCLE (#2) & STARTS CYCLE (#6) BEFORE MAIN MAKES REQUEST (#3)
  2. MAIN EXECUTES DELAYED WRITE CYCLE AFTER TASK CYCLE (#6) COMPLETE.

ASYNCHRONOUS MICROPROCESSOR RANDOM ACCESS MEMORY ARBITRATION CONTROLLER

BACKGROUND OF THE INVENTION

1. Field of the Invention

The present invention, generally, relates to data processing computer systems and, more particularly, to a new and improved system of arbitration for access to a random access memory unit by a plurality of asynchronous microprocessor devices.

It is common practice in networks having multiple microprocessors that two of the microprocessors will share large amounts of memory. It is known also that, as between two such microprocessors, a system of arbitration must be provided to control their access to the common memory. The problem is compounded when the microprocessors are asynchronous.

There are many off-the-shelf vendor components available today that have Dual Port Memory Controls which include various amounts of memory with each module, but a difficulty is experienced in attempting to use them with microprocessors that are asynchronous. Another difficulty with such components available today is that the memory associated with these components are too small or that the memory controls do not match the control needs as between two microprocessors because of a mismatch with the synchronism of the microprocessors.

In the past, it has been customary in a device utilizing a plurality of microprocessors for one microprocessor to be connected to a memory unit to the exclusion of the others. Other microprocessors may obtain access only while the memory unit is "idle".

It was recognized early in the art that if the common memory unit could be utilized more efficiently, the efficiency of the whole computer network would be improved. Thereafter, the search was on to develop a wide variety of systems, techniques and/or devices to permit such improvement.

2. Description of the Prior Art

From about the mid 1970's to about the mid 1980's, the search for an improvement in the overall efficiency of utilization of a common memory as between at least two memory utilization devices was most intense. However, many arrangements developed during this period used a system involving a "wait" signal to identify the microprocessor that was to be denied access to the common memory.

The microprocessors that are arranged to use the "wait" signal (in contrast with a "not ready" signal) stop functioning at cycle boundaries. Then, such microprocessors release their control lines to other devices.

An early to Matsumoto U.S. Pat. No. 4,065,809 was issued in 1977 and involves two synchronous CPU's with a simple flip-flop to render one CPU inactive when the other CPU is active. While effective in a simple arithmetic environment, this arrangement is inoperative in a complex environment in which the present invention is adapted to function.

U.S. Pat. No. 4,096,572 issued in June, 1978, to Namimoto and teaches the use of a handshake system with a "wait" signal, if there is a memory access conflict. A request for access to the common memory is responded to by an "acknowledge" or a "wait" signal, and processors provide memory access timing. The present invention does not use a request/acknowledgement handshake method, as will be understood better as the description proceeds.

In October, 1978, U.S. Pat. No. 4,121,285 issued to Chen. This patent teaches that, when several devices must access a common unit, equal priority is provided. This arrangement only determines priority and does not provide for any access timing, as with the present invention.

Then, in December, 1978, U.S. Pat. No. 4,128,881 issued to Yamamoto et al. The arrangement taught by this patent provides a different, pre-fixed address for each processor that must have access to a common memory. This arrangement does not involve a need to determine priority between the processors and, therefore, is completely at variance with the present invention.

A more recent U.S. Pat. No. 4,542,454 issued September, 1985, to Brcich et al. is entitled "Apparatus For Controlling Access To A Memory". However, its system is for access to a memory by a single processor for different purposes. It teaches using a dynamic memory controller 26 to obtain access under four different modes or functions, such as (1) refresh without error detection, (2) refresh with error detection, (3) clear and (4) read/write.

Therefore, the need still exists today for a control to arbitrate effectively between two asynchronous microprocessors in a network having a common memory. The present invention not only provides such an arbitration control device but reduces the usual cost of these devices while, in addition, providing other desirable and useful features, as will become more readily apparent.

OBJECTS AND SUMMARY OF THE INVENTION

Accordingly, it is a principal object of the present invention to provide an arbitration controller for use with asynchronous microprocessors.

It is also an object of the present invention to provide a system of arbitration for access to a memory that is common to two microprocessors.

Briefly, the present invention provides a system of arbitration for access to a common memory by two microprocessors without excluding either microprocessor for more than a predetermined, limited period of time. An arbitration system in accordance with the invention includes two microprocessors connected to a common memory unit through an arbitration controller with a connection to convey a "not ready" signal to a microprocessor requesting access to the memory when the other microprocessor has access. The "not ready" signal stops the requesting microprocessor during its cycle. The arbitration system re-creates the timing up to the point that the requesting microprocessor was stopped, removes the "not ready" condition when the cycle of the common memory is ready to permit access and allows the requesting microprocessor to complete its cycle of operation. Thereafter, the requesting microprocessor has access to the common memory for a predetermined, limited period of time, at which point, access is permitted to the other microprocessor for a predetermined, limited period of time before access is permitted again to the first, requesting microprocessor. The two microprocessors, thus, alternate access to the common memory.

The above and other objects, features and advantages of the present invention will become more readily apparent from the following detailed description of the presently preferred embodiment.

BRIEF DESCRIPTION OF THE DRAWINGS

The present invention will be described with reference to the accompanying drawings, in which.

DETAILED DESCRIPTION OF THE INVENTION

There is at least one important difference between the arbitration controller of the present invention and those of the prior art. The arbitration controller of the invention depends upon the particular microprocessors that are seeking access to a common random access memory to be equipped for a "not ready" mode of interruption in their normal operating cycles. A "not ready" capability does not exist on all microprocessors. It stops normal operations of the microprocessor at the point in its cycle that it receives a "not ready" signal from the common memory.

A "not ready" mode is the state of a microprocessor when the "not ready" condition is present and is controlled by the arbiter. It is the arbiter controls that must re-create the timing sequence in the microprocessor up to the point at which the normal operation of the microprocessor was interrupted, remove the "not ready" condition, and allow the microprocessor to complete its interrupted cycle.

Before presenting a detailed description of the respective figures in the drawings, an identification of the abbreviations used in these figures is given in the following Glossary of terms:

| ALE | Address Latch Enable |
|---|---|
| ARDY | Asynchronous ready |
| BHE | Bus high enable |
| CTRLS | Controls |
| DEN | Data bus enable |
| DIAG | Diagnostic |
| DRV | Driver |
| DT/R | Data transmit/receive |
| FF | Flip flop |
| EPROM | Electrically programmable read only memory |
| I/O | Input/output |
| IRPT | Interrupt |
| LCS | Lower memory chip select |
| MCS | Mid memory chip select |
| N | Inverter circuit |
| NMI | Non-maskable interrupt |
| OE | Output enable |
| PCS | Peripheral chip select |
| PTY | Parity |
| PTY CHK | Parity checker |
| RAM | Random access memory |
| RD | Read |

| -continued | |
|---|---|
| ROM | Read only memory |
| RST | Reset |
| TBA | Task bus acknowledge |
| TBR | Task bus request |
| TXC | Task transfer complete |
| WR | Write |
| UCS | Upper memory chip select |
| UP | Microprocessor |
| XCVR | Transceiver |

Figure 1:
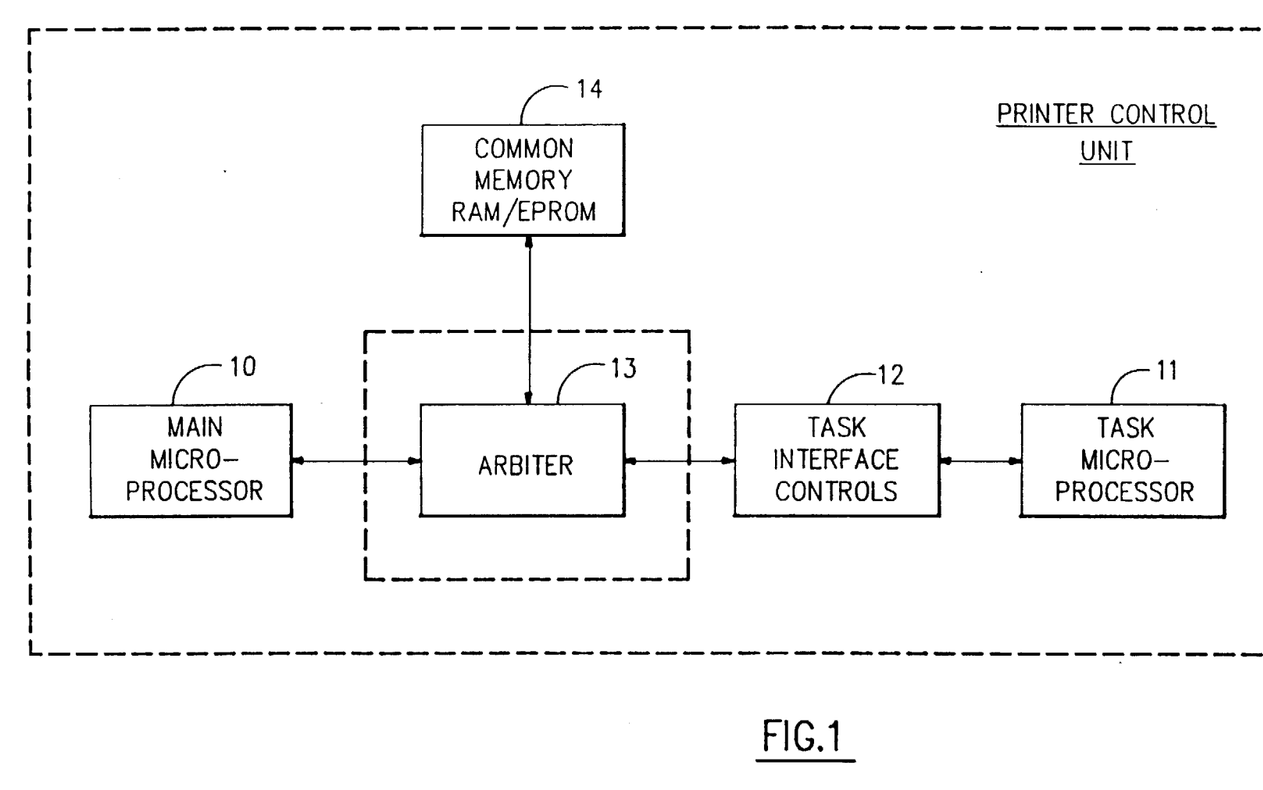
FIG. 1 is a block diagram to illustrate component parts of an arrangement according to the invention.

Referring first to FIG. 1 of the drawings, a MAIN microprocessor is identified by the reference numeral 10, and a TASK microprocessor is identified by the reference numeral 11. The TASK microprocessor 11 interfaces the printer control unit to several different kinds of data processing systems. Each type of data processing system requires a unique TASK interface adapter, in the form of the invention that will be described.

The problem solved by the present invention relates to an ARBITER 13 for controlling access by the two microprocessors 10 and 11 to a common memory 14. At least one of the circuit arrangements of the invention is uniquely adapted for use in a printer apparatus for permitting a TASK microprocessor to be able to communicate with the MAIN microprocessor. Since details of such a printer apparatus do not form a part of the present invention, only the legend "PRINTER CONTROL UNIT" is given in FIG. 1. Details of the ARBITER 13 are given in FIGS. 2 and 3.

Figures 2, 2A:
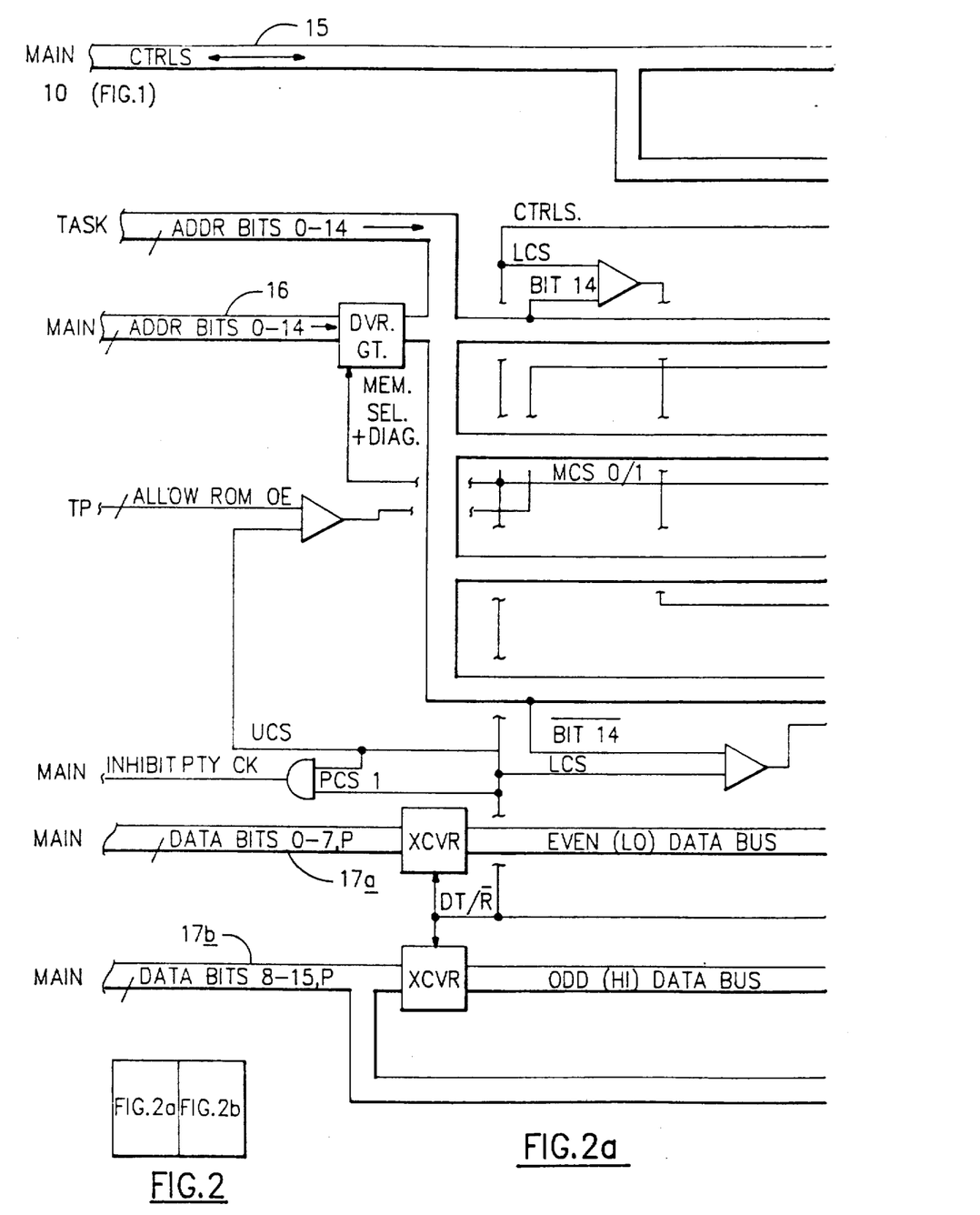
FIGS. 2, 2a & 2b are an overview of a random access memory with control connections to two microprocessors.
Figure 2B:
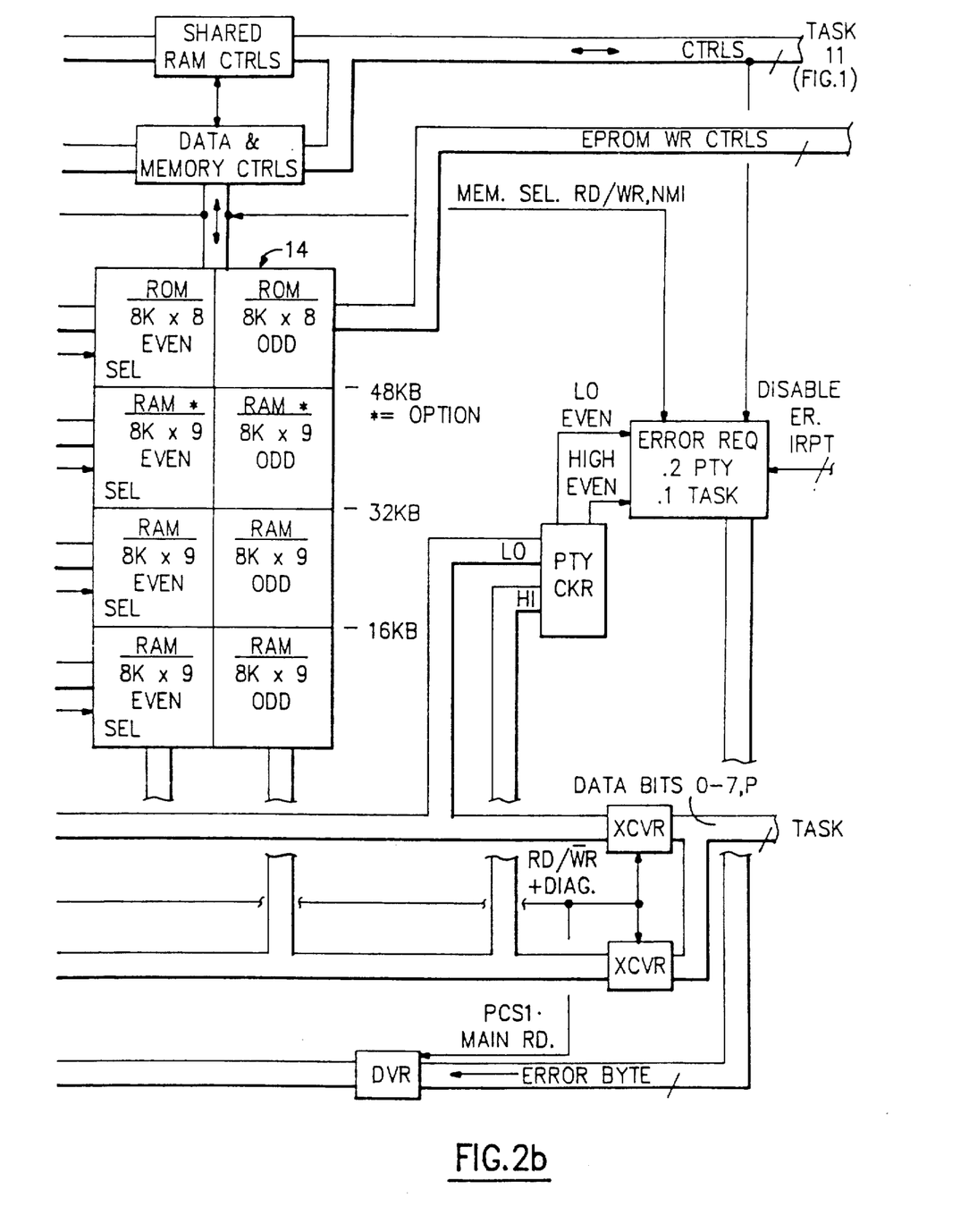

In FIG. 2 of the drawings, various connections between both the MAIN microprocessor 10 and the TASK microprocessor 11 and the common memory 14 are illustrated. Also shown is a presently preferred inner configuration for the common memory 14. Of course, this inner configuration may vary with other uses of the invention, as will be understood.

For the MAIN microprocessor 10 to obtain access to the common memory 14, it uses a control bus 15, an address bus 16 and a data bus 17a and 17b. However, if the TASK microprocessor 11 requires access to the common memory 14 while the MAIN microprocessor 10 has access, a system of arbitration is provided in the following manner. This is a form of "contention", as will be described more fully presently.

Figures 3, 3B:
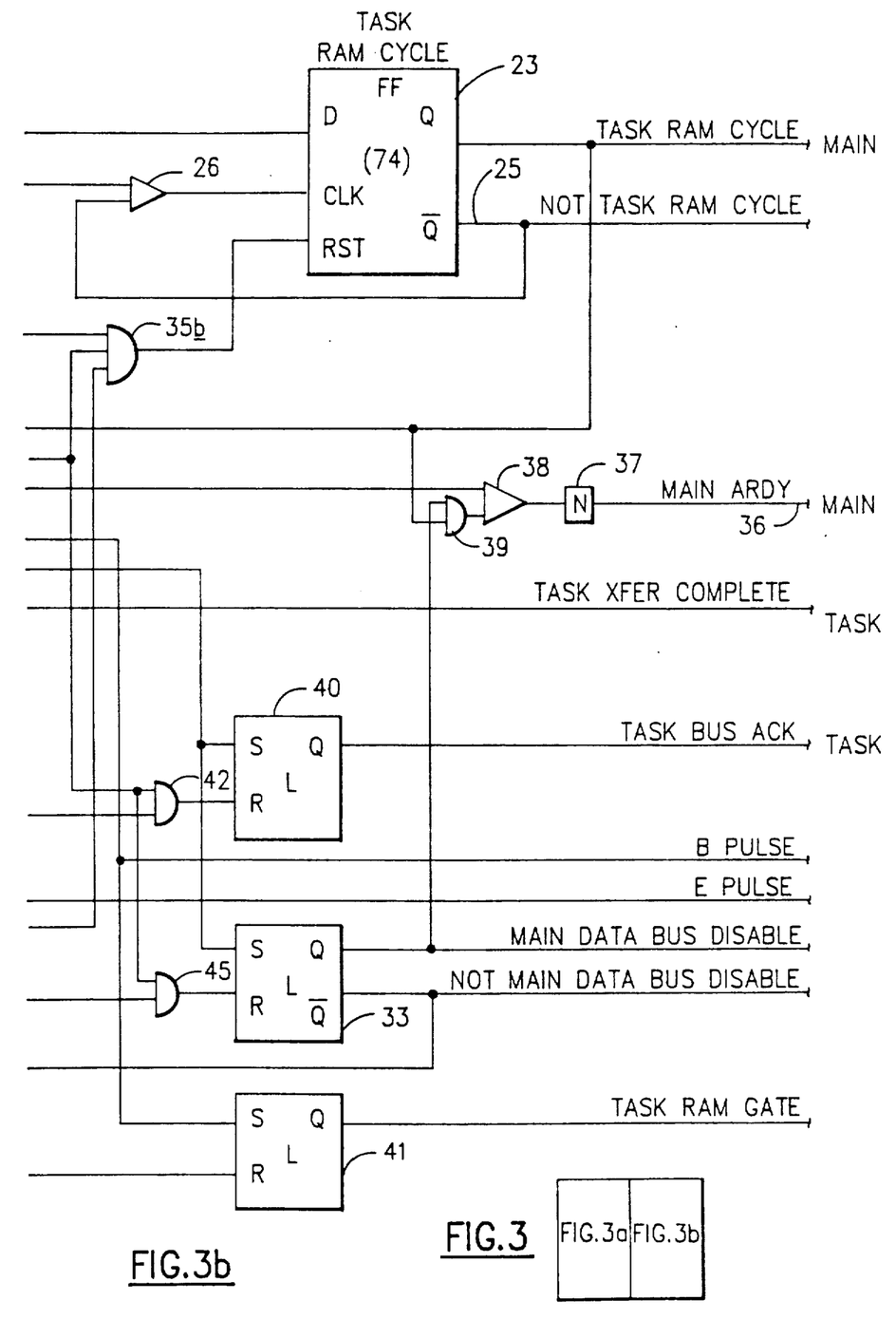
FIGS. 3, 3a & 3b are a block diagram of an arbitration control arrangement for access by the two microprocessors to the common memory shown in FIG. 1, in accordance with the present invention.
Figure 3A:
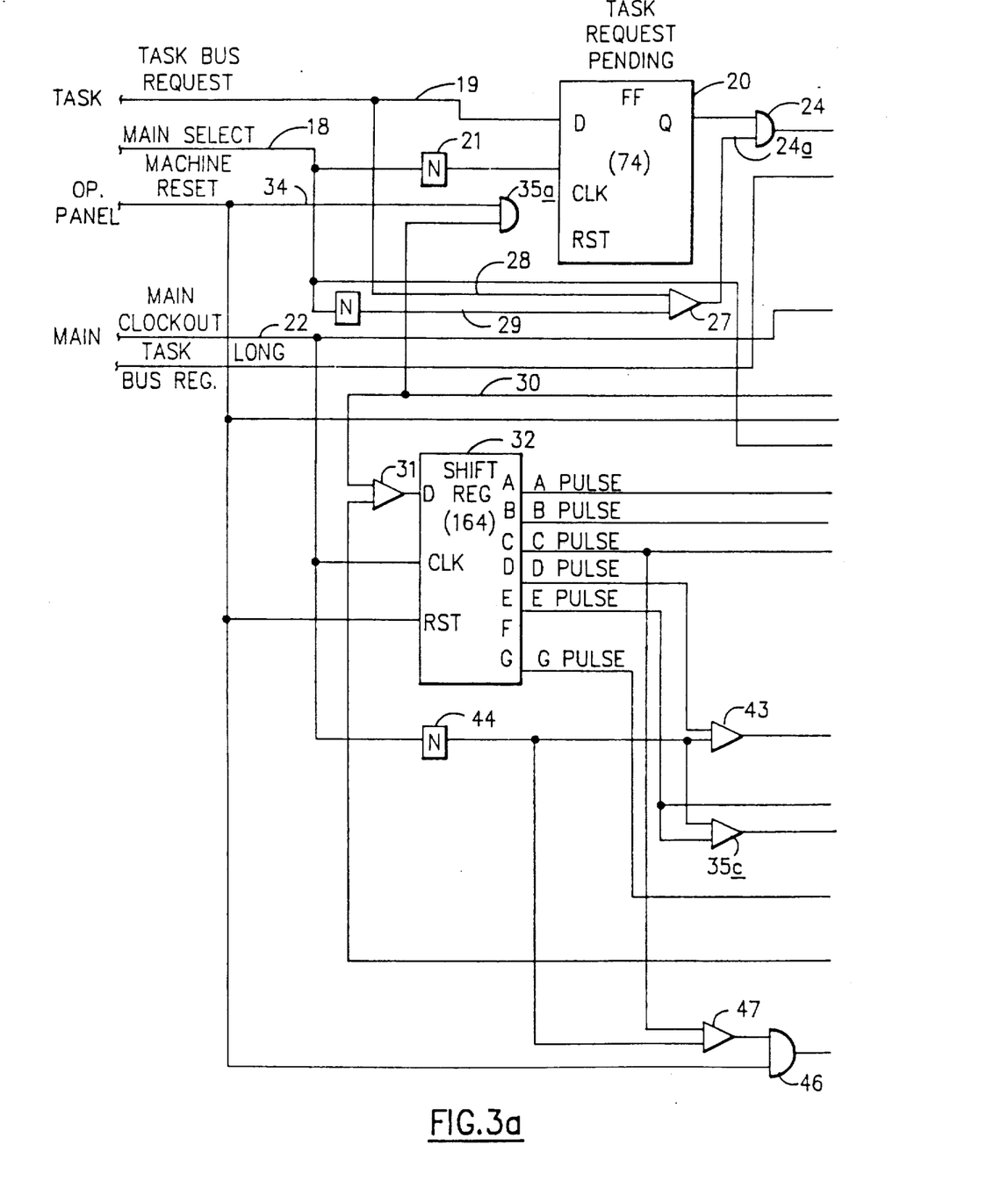

Referring to FIG. 2 and to FIG. 3, at the completion of each cycle of the common memory 14, the signal on the bus 18, also identified as "MAIN Select", goes inactive. This signal is active during each cycle of the common memory, and at the end of each cycle, it goes inactive. If the TASK microprocessor needs access to the common memory 14, an active signal is applied on a connection 19 and to a terminal D of a flip flop device 20. By "active" and "inactive", is meant only that the signal is a "one" or a "zero".

At the end of a cycle of the MAIN microprocessor 10, the signal on the bus 18 goes inactive, which applies a clock signal at a "clk" terminal on the flip flop 20, but since the two microprocessors are asynchronous, synchronism must be obtained with the MAIN clockout signal. To accomplish this, according to the invention, a second flip flop device 23 is connected to an OR gate 24 through which, when the flip flop 20 is "on", a terminal D on the flip flop device 23 is active.

At this point in the cycle being described, the flip flop 23 must be turned "on", and to accomplish this, two signals are needed, one from the "not on" terminal 25 of the flip flop 23 and the other from the MAIN clockout 22 in order to apply a signal to the "clk" terminal of the flip flop 23 through an AND gate 26. This condition is in existence now, and so, there is an output from the AND gate 26 and the flip flop 23 is turned "on".

The MAIN clockout clock pulse is the signal that clocks the entire system, in accordance with the invention.

The cycle just described above is a two-step sequence: first, the "TASK request pending" flip flop 20 is turned "on", because there is a "contention" between the two microprocessors for access to the common memory 14, and second, the TASK RAM cycle flip flop 23 is turned "on" as described. Now, with the flip flop 23 turned "on", the TASK microprocessor will be synchronized with the MAIN clockout signal on connection 22.

It should be noted that the only time that the TASK request pending flip flop 20 is used, according to the invention, is when there is contention. When the TASK microprocessor requests access to the common memory 14 and the MAIN microprocessor is not using the common memory, the only thing to be done is to synchronize the TASK microprocessor with the MAIN clockout signal on connection 22 which is done with a signal on the input connection 24a to the OR gate 24.

To develop a signal on the input connection 24a to the OR gate 24, and AND gate must have two signal inputs. One input signal on connection 28 is from the TASK bus request to indicate that the TASK microprocessor needs access to the common memory 14, and the second input signal on connection 29 indicates that the MAIN microprocessor is not using the common memory.

There are only two situations, one when there is contention and the other when there is no contention. If there is contention, the flip flop 20 is needed, and if there is no contention, only the flip flop 23 is needed. In both of these situations, however, the flip flop 23 is used because it is needed to start the synchronism procedure for synchronizing the TASK microprocessor with the MAIN clockout signal on connection 22.

Therefore, the synchronization of any TASK microprocessor with the MAIN clock signal is accomplished by, first turning "on" the flip flop 23, as described above. Now, the connection 30 has an "active" signal, and this is applied to one terminal of an AND gate 31.

Every system must have a clock to control its activities in an orderly and predictable manner. The system of the invention uses the MAIN clockout signal on line 22. It is a free-running clock at a frequency that is predetermined. In the present invention as used in a printer apparatus, it runs at 7.5 mega-Hertz, meaning it cycles once every 133 nano-seconds. Of course, its frequency can be set to correspond with a particular use. But it is the base clock in this use, and it is running whenever the printer power is turned on.

The flip flop devices 20 and 23 are a type known as "D" type flip flops, which require two conditions for one to be turned "on", as will be understood readily by one skilled in the art. First, the signal on the D terminal must be active, and second, there must be an edge on the signal at the "clk" terminal. An "edge" is a transition for the signal on the "clk" terminal. On the other hand, if the signal at the terminal D is not active, a transition at the "clk" terminal will cause the flip flop to turn "off".

The "clk" on the shift register 32 is slightly different. The use of the shift register 32 is to provide a source of signals in a predetermined sequence or in some other desired manner. For the present use, the pulses out from the shift register 32 are labeled "A" through "G", and these pulses are generated only when the input terminal "D" on the shift register 32 is active, a condition which is controlled by an AND gate 31.

The AND gate 31 develops a signal to turn the terminal "D" of the shift register 32 "on" when its input is satisfied, which is when the flip flop 23 is turned "on" and there is an active signal on the connection 30 and when a LATCH device 33 is turned "off". At this time in each cycle, i.e., when the AND gate is developing an active signal, or a "1", when the MAIN clockout signal goes from a negative to a positive, that causes the first pulse to be developed by the shift register 32, which is an "A" pulse.

Now, when the next transition occurs on the MAIN clockout signal, the "A" pulse ends and a "B" pulse is developed, and so forth. This pulse sequence is illustrated clearly on line 3 of FIG. 4.

To describe the RESET function of the "Rst" terminal on each flip flop 20 and 23, it can be reset by a general reset condition in the printer control unit, which is a "machine reset" signal on the connection 34 through an OR gate 35a. The TASK request pending flip flop 20 is reset logically when the TASK RAM cycle flip flop 23 is turned "on". The TASK RAM cycle flip flop 23 is reset through an OR gate 35b by a machine reset signal, or a TASK bus request long signal, or a signal from an AND gate 35c. The signal from the AND gate 35c is the normal reset signal for the flip flop 23.

If a signal on connection 36, with a legend also of "MAIN ARDY", is not active, the MAIN microprocessor is prevented from obtaining access to the common memory and is made "not ready". Such a signal is developed by the AND gate 38 through an inverter 37 in response to the signal on the MAIN select connection 18 plus either (due to OR gate 39) the LATCH 33 being turned "on" or the TASK RAM cycle flip flop 23 being turned "on".

By the means of the lock signal on the connection 36 the MAIN microprocessor is prevented from obtaining access to the common memory 14 while the TASK microprocessor completes its cycle of the common memory. At the end of this cycle, the signal on the connection 30 is not active, because the flip flop 23 turns "off", and therefore, at this time, the MAIN microprocessor may obtain access for its cycle of the common memory.

Figure 5:
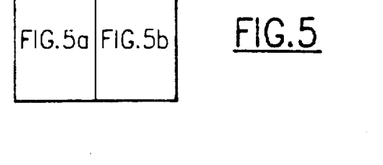
FIGS. 5, 5a & 5b are a diagram illustrating details of the timing of the arbitration and memory cycle for the arrangement shown in FIG. 2.
Figure 5A:
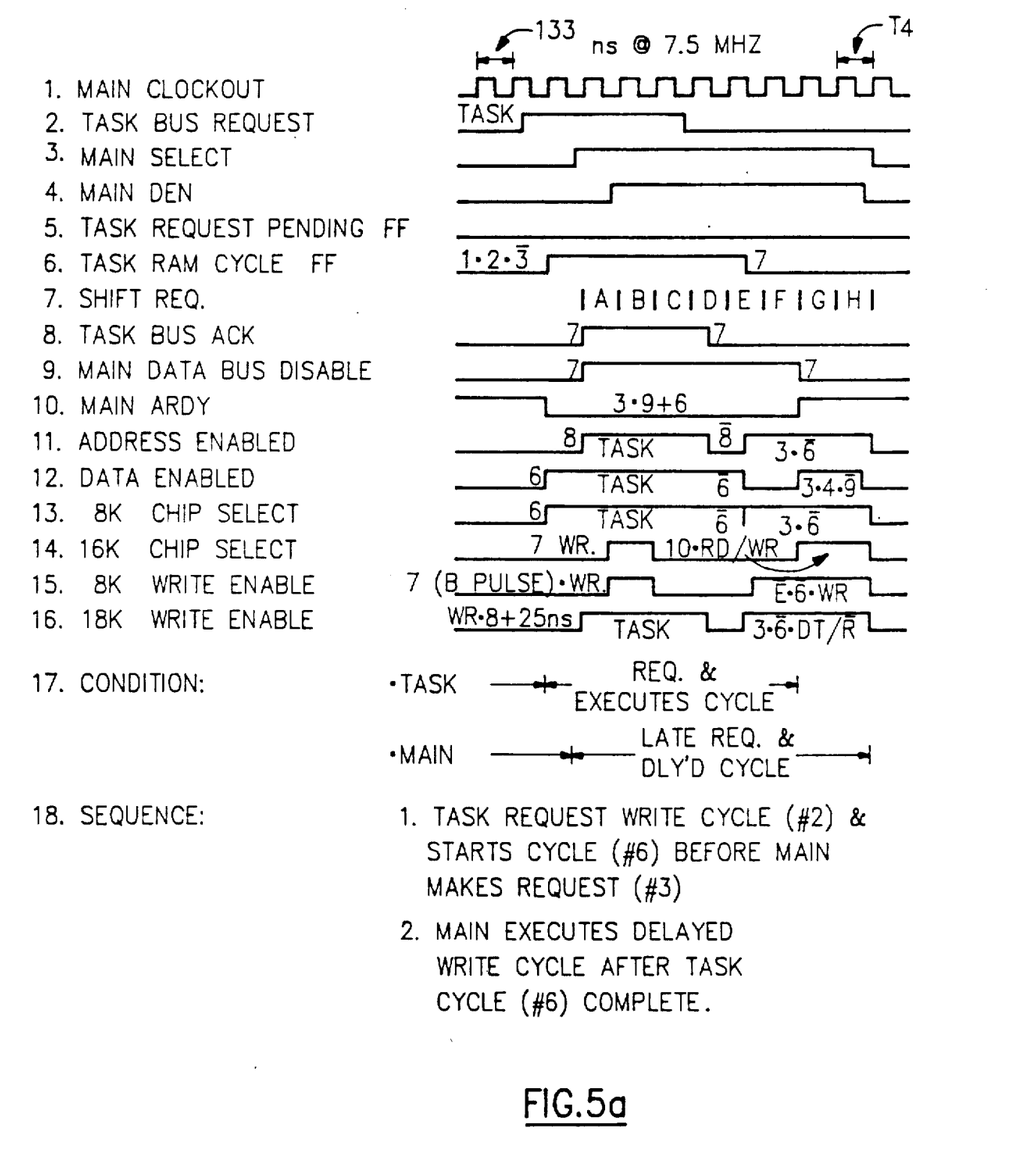
Figure 5B:
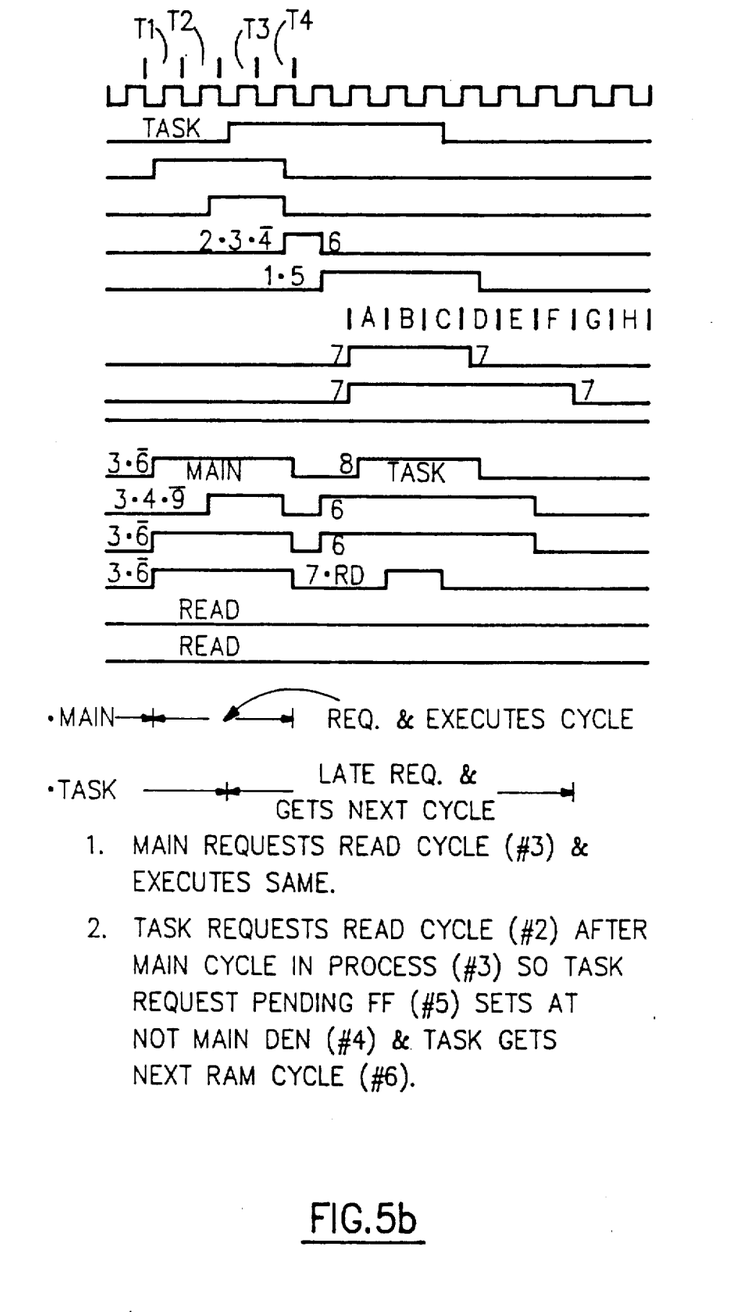

Note that, in FIG. 5a, line No. 1, with the identity legend "MAIN clockout", shows the 133 nano-second (7.5 MHz) clock signal to which an asynchronous TASK microprocessor, according to the invention, is synchronized. The other signals are identified by appropriate legends also so that the interaction of the respective components is readily understandable without much additional effort.

For example, item No. 2 shows that the TASK Bus Request has been asserted, and now, moving down to item No. 6 shows when the TASK RAM cycle flip flop turns "on". At the beginning of this pulse, note that "1.2.3" is indicated, which in words, reads, "one.two.-not 3". This can be translated to say, "item No. 1 is needed, item No. 2 is needed and not item No. 3" in order to accomplish this item No. 6.

In FIG. 3 of the drawings, note that two LATCH devices 40 and 41 are shown in addition to the LATCH DEVICE 33. Each LATCH device, 33, 40 and 41, simply involves a set terminal "S" and a reset terminal "R" as inputs in order to turn each one "on", meaning the "Q" terminal is active (or "1"). This means simply that a "set" turns a LATCH "on", and a "reset" turns a LATCH "off".

Consider the LATCH 40 first, an "A" pulse from the shift register 32 will cause the LATCH 40 to turn "on", providing an active condition (or a "1" signal) at its "Q" output terminal. This condition remains until a reset occurs, which is in one of two ways. An OR gate 42 connects one or the other of two signals to the reset terminal. The uppermost connection to the OR gate 42 connects with the "machine reset" signal, provided by a general condition in the printer control unit. The lowermost connection to the OR gate 42 is a logical connection for the signal provided by the invention as follows.

An AND gate 43 provides a logical signal when there is a "D" pulse from the shift register 32 plus NOT a MAIN clockout signal (note the inverter "N" identified also by the numeral 44). When this occurs, the TASK Bus Acknowledge connection goes from a "one" to a "zero", or is turned "off". Looking at FIG. 5 reveals exactly how this appears (in item No. 8) and when, (or its relative timing).

With this description, the operation of the other LATCH devices can be understood readily. For example, take the LATCH device 33, it is turned "on" by a set signal to its "S" terminal by an A pulse output from the shift register 32 directly, and it is turned "off" or reset by a G pulse. From the timing chart in FIG. 5, it can be seen that the LATCH device is "on" for a longer period of time, by item No. 9 being "on" from the beginning of the A pulse to the beginning of the G pulse. The G pulse is connected through an OR gate 45, the other terminal being the same "machine reset" signal described above.

The final LATCH device 41 is used in this logic circuit for detail memory controls. Functionally, it is not an important device in accomplishing the purposes of the invention and is included for completeness of the disclosure. This LATCH is set by a B pulse from the shift register 32 to provide a signal output on the TASK RAM gate bus, as shown. The LATCH device 41 is reset by either the same "machine reset" signal described previously through an OR gate 46 or by an output from an AND gate 47. One of the two input connections to the AND gate 47 is by a connection from the same inverter 44 described previously in connection with LATCH 40, and the other input connection is from the C pulse output of the shift register 32.

While only the LATCH devices 33, 40 and 41 are shown and described, it is understood that the shift register 32 provides any number of pulses of any desired duration for any needed control purpose. One important purpose accomplished by the shift register 32 is control of access by the MAIN microprocessor to the common memory, particularly when the TASK microprocessor needs access.

By this means of control, neither microprocessor is locked out of such access for a lengthy period of time. According to the invention, each of the two microprocessors have access to the common memory for a shared, predetermined, limited period of time. In this embodiment, that limited period of time is for one cycle of the common memory.

Still another important use of the shift register, according to the invention, is to synchronize the two asynchronous microprocessors. The "clk" terminal of the shift register 32 is connected directly with the MAIN clockout signal of the MAIN microprocessor so that the various pulses output from the shift register 32 are synchronized with the MAIN microprocessor.

As described previously hereinabove, FIG. 2 of the drawings shows the various input/output connections for a particularly arranged random access memory unit, identified with the legend "COMMON MEMORY". This unit is common to two microprocessors, one being identified with the legend "Main" and the other with the legend "Task".

While the legend "Task" is termed a microprocessor in the following description, it is actually more because the legend "Task" is an interface or an adapter since it interconnects an entire host system to the printer control unit, FIG. 1. Therefore, it will be understood that the legend "Task" is called a microprocessor in this description for convenience. To be absolutely accurate, the legend "Task" identifies an Adapter Microprocessor Interface.

The Main microprocessor that is used in this presently preferred embodiment is an Intel 80186 that is available commercially from the Intel Corporation.

The particular random access memory unit in FIG. 2 has a total of 32K bytes of memory that is used by the Main microprocessor, 4K of which is shared with the Task microprocessor. This random access memory unit also contains 16K bytes of Read Only Memory (ROM) which is available only to the Main microprocessor.

There is shown also in FIG. 2 that the parallel interface to the Main microprocessor consists of address, control and data (2 bi-directional bytes) signals to access the Random Access Memory (RAM) and the ROM (or the EPROM). Access to the RAM by the Main microprocessor will be more frequent than by the Task microprocessor because all of the Main microprocessor's working memory is contained within the circuit of FIG. 2. It should be noted also that parity checkers are included in this circuit to verify data integrity for RAM accesses for both data bytes.

In FIG. 2, there is shown also that the parallel interface to the Task microprocessor consists of address, control and data (1 bi-directional byte) signals. The purpose of this parallel interface is to allow Task access to the 4 KB RAM that is shared with the Main microprocessor. During operations, this part of the RAM is used to pass control and data information back and forth between the two microprocessors.

It should be noted that FIG. 3 contains all of the arbitration controls to designate that the Main microprocessor can not perform two back-to-back accesses to the common memory while the Task microprocessor is requesting access. If the Task microprocessor initiates a request for access while the Main microprocessor is accessing the RAM, the Task microprocessor must wait until the Main microprocessor completes a cycle of its access to the RAM. At the completion of the MAIN microprocessor cycle, the TASK bus request signal will set the TASK RAM flip flop, as previously described, and cause the shift register 32 to activate the LATCH 40 to generate a TASK bus acknowledge signal. This signal is the beginning of the TASK cycle.

At this point, assume that the Main microprocessor has not completed its need for access to the RAM. It is nevertheless put on hold by a "not ready" signal for one cycle of the RAM, while the Task microprocessor completes its one cycle of RAM access time. Thus, the two microprocessors alternate access to the RAM until each has completed its need for access.

By this procedure, neither microprocessor is locked out for more than a predetermined period of time which, in the preferred embodiment, is one cycle of RAM time. However, if both microprocessors request access to the common memory at the same time, the arbitration controller of the invention gives priority to the Main microprocessor, but upon completion of one cycle of access time, access by the Main microprocessor is interrupted while the Task microprocessor has access for one cycle.

FIG. 3 of the drawings shows the arbitration controls to accomplish the above-described routines. The various legends included directly in all of the FIGS. of the drawings permit one skilled in this art to understand these circuit arrangements, and therefore, this written description is only supplemental to the full disclosure of the drawings.

For example, it is understood that the block in FIG. 3 with the legend "N" that is in the connection labeled "MAIN ARDY" serves to hold the MAIN microprocessor in its "Not Ready" state while the TASK microprocessor cycle of access is in progress. This is accomplished, in accordance with the invention, because the "N" circuit actually is an Inverter, thereby inverting the applied signal.

For example, it should be noted that, since the MAIN microprocessor has priority, the TASK Request Pending FF will only be set to indicate that the TASK microprocessor has requested a cycle of access time with the common memory, and this indication is given only while the Main microprocessor is accessing the RAM, i.e., during its turn with the Common Memory. Thereafter, as described above, the Task microprocessor will be granted access for the next memory cycle, which will be indicated by the set of the Task RAM Cycle FF.

All of the logic in FIG. 3 is activated only to control the Common Memory for a Task microprocessor turn at a RAM cycle. When the Main microprocessor is using the Common Memory, all of the logic in FIG. 3 is degated.

Figure 4:
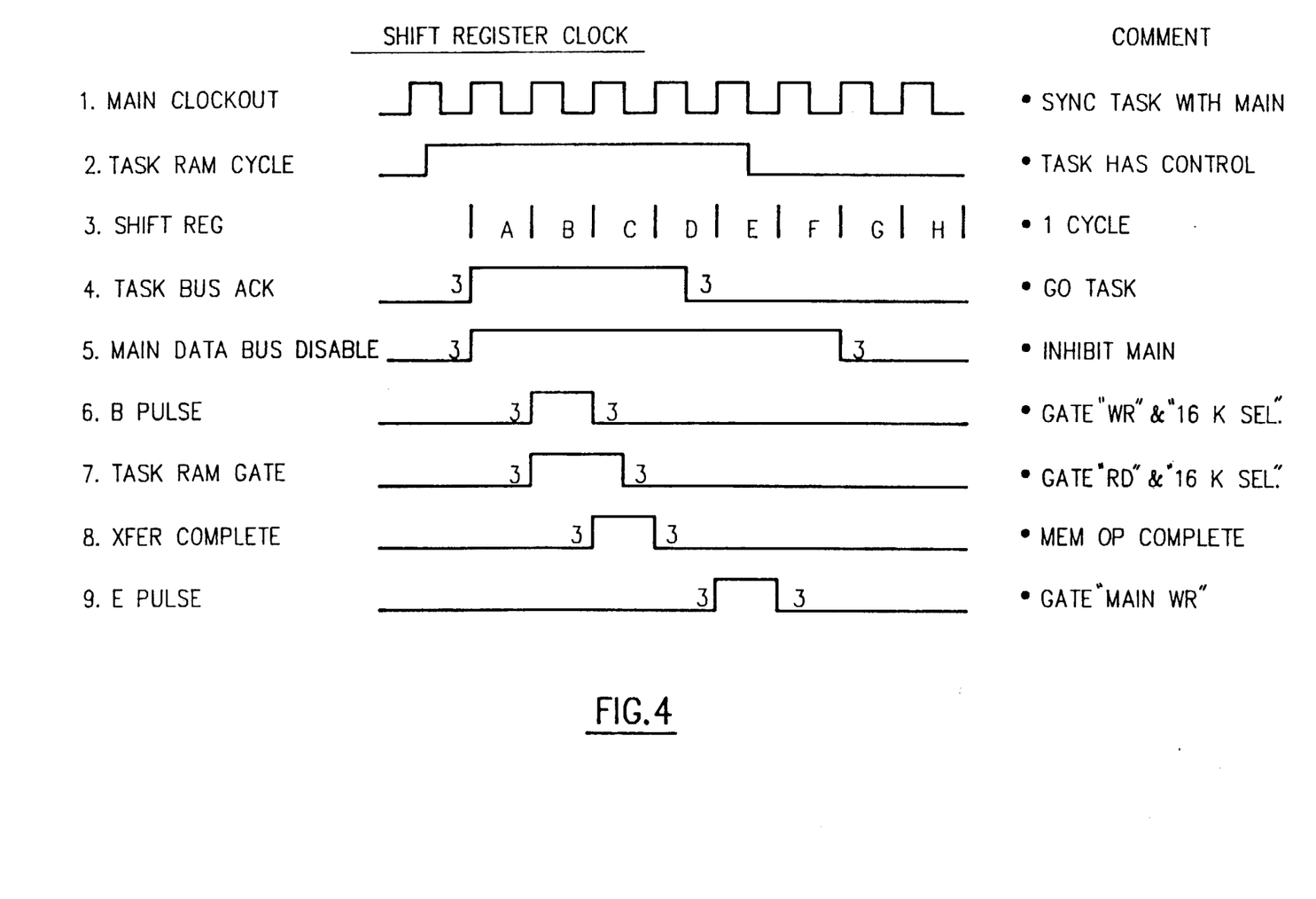
FIG. 4 is a diagram illustrating details of the timing for one shift request clock cycle for the function of FIG. 2 in obtaining access by each microprocessor, in turn, to the random access memory of FIG. 1.

FIG. 4 and FIG. 5 show details of the timing relative to priority arbitration, as well as memory cycles for both of the microprocessors. It is believed that all of the legends included directly on these drawings will be more than sufficient to understand their function and operation. For example, the timing for operation of the block, in FIG. 3, with the legend "Shift Reg. (164)" is given clearly in FIG. 4 of the drawings.

It is seen also in these views that, in accordance with a feature of the present invention, bi-directional data communication is available between the Main and the Task microprocessors directly without an associated memory cycle being involved or required. This is accomplished by using the Data Busses 17a and 17b under the control of the Main microprocessor's "MAIN/Task connect" connection and the "MAIN DT/R" signals shown in FIG. 2.

Having presented hereinabove and in the accompanying drawings a complete description of the presently preferred embodiment of the invention, it will be apparent to those skilled in this art that modifications and changes can be made, but it is understood that all such modifications and changes that come within the spirit and scope of the appended claims are within the present invention.

What is claimed is:

1. An arbitration controller for determining access to a common memory by two asynchronous microprocessors, comprising:
   first circuit means for connecting and disconnecting each of said two asynchronous microprocessors to said common memory for a predetermined limited period of time;
   clock means connected with said first circuit means for determining said predetermined limited period of time for connecting said two asynchronous microprocessors alternately to said common memory when both of said two asynchronous microprocessors contend for access to said common memory; and
   control circuit means connected with said first circuit means to interrupt one of said two asynchronous microprocessors at the end of said limited period of time when the other of said two asynchronous microprocessors is connected for access to said common memory;
   so that access to said common memory by each of said two asynchronous microprocessors is, alternately, for only one, predetermined, limited period of time.

2. An arbitration controller according to claim 1 wherein said first circuit means includes flip-flop circuit means connected to be reset by said clock means while both of said two microprocessors contend for access to said common memory.

3. An arbitration controller according to claim 1 wherein said first circuit means includes first flip-flop means connected to be reset by said clock means, and second flip-flop means connected to said first flip-flop means to set said first flip-flop means for connecting a preselected one of said two microprocessors for access to said common memory when both of said microprocessors contend for access to said common memory.

4. An arbitration controller according to claim 1 wherein said control circuit means includes shift register means connected to set a latch device for producing an interrupt signal at the end of each of said limited periods of time while both of said two microprocessors are contending for access to said common memory.

5. An arbitration controller according to claim 1 including inverter circuit means connected to reset said clock means at the end of said limited period of time for producing an interrupt signal to initiate access to said common memory by one of said two microprocessors when the other is accessing said common memory.

6. In a printer apparatus of the type used with data processing equipment, the printer apparatus having memory means, access to which being necessary by a plurality of asynchronous microprocessor means during normal operations of the printer apparatus, means for controlling such access, comprising:
   first circuit means for connecting and disconnecting each of said plurality of asynchronous microprocessor means with said memory means for a predetermined limited period of time;
   clock means connected with said first circuit means for determining said predetermined limited period of time and for determining an internal operating cycle of said memory means; and
   arbiter means connected with said plurality of asynchronous microprocessor means for selecting one of said plurality of asynchronous microprocessor means for access to said memory means at the end of said predetermined limited period of time, for adjusting an internal operating cycle of a selected asynchronous microprocessor means to synchronize said internal cycle with said internal operating cycle of said memory means, and for connecting said selected asynchronous microprocessor means for access to said memory means;

so that access to said memory means by any of said plurality of asynchronous microprocessor means is always for one predetermined limited period of time.

7. In a printer apparatus as defined in claim 6 wherein said clock means determining said internal operating cycle of said memory means is an internal clock of an asynchronous microprocessor means that is connected for access to said memory means.

8. In a printer apparatus as defined in claim 6 wherein, whenever there is contention for access to said memory means, a microprocessor means is connected to synchronize its internal operating cycle with that of said memory means, and said arbiter means limiting access to said memory means to only one limited period of time for any of said microprocessor means, whenever there is contention for access to said memory means.

9. In a printer apparatus as defined in claim 6 wherein said plurality of asynchronous microprocessor means consists of two asychronous microprocessor means, and any one of said two asynchronous microprocessor means being limited to only one limited period of time whenever there is contention for access to said memory means.

10. In a printer apparatus as defined in claim 6 wherein said arbiter means includes flip flop circuit means having two states, one state being conductive and the second state being nonconductive, connected to permit access to said memory means by a microprocessor means when in one state and to deny access to said memory means by any microprocessor means when said flip flop circuit means is in said second state.

11. In a printer apparatus as defined in claim 6 wherein said arbiter means includes first flip flop circuit means having two states, one state to permit access by one asynchronous microprocessor means, second flip flop circuit means connected between said first flip flop circuit means and said memory means, and means to switch said second flip flop means to said one state at the end of said limited period of time.

12. In a printer apparatus as defined in claim 6 wherein said arbiter means for adjusting an internal clock cycle of a microprocessor means seeking access to said memory means includes shift register means, responsive to said clock means, to bring the internal operating cycle of said microprocessor means seeking access into synchronism with an internal operating cycle of said memory means.

13. A controller for a printer apparatus having its functions stored in memory means common to a plurality of asynchronous microprocessor means, at least one of which is equipped with a "not ready" mode of interruption, said controller comprising:

means for connecting and disconnecting each of said plurality of asynchronous microprocessor means with said common memory means for a predetermined limited period of time;

clock means connected with said common memory means for timing an internal operating cycle for said common memory means;

first circuit means for giving priority to one of said asynchronous microprocessor means when there is contention for access to said common memory means;

second circuit means, responsive to a predetermined signal, for initiating an adjustment in the internal timing of an asynchronous microprocessor means contending for access to said common memory means to bring it into synchronism with said internal operating cycle of said clock means; and means to interrupt said connection means whenever there is contention for access to said common memory means after one predetermined, limited, period of time;

whereby each of said plurality of asynchronous microprocessor means alternates for one of said predetermined, limited periods of time for accessing said common memory means.

14. A controller for a printer apparatus according to claim 13 wherein said clock means for timing an operating cycle of said common memory means is an internal clock of one of said asynchronous microprocessor means.

15. A controller for a printer apparatus according to claim 14 including arbiter circuit means to disconnect said connection means when one of said microprocessor means is accessing said common memory means and another microprocessor means requires access to said common memory means.

16. A controller for a printer apparatus according to claim 15 including circuit means to limit the time of said disconnect to a predetermined limited period of time, during which said one microprocessor means is permitted access again, and said circuit means limits such access to the same period of time before access to said common memory means is returned to said another microprocessor means.

17. A controller for a printer apparatus according to claim 16 including circuit means to synchronize an internal functional timing of said another microprocessor means with said clock means.

18. A controller for a printer apparatus according to claim 15 wherein said first circuit means includes flip flop means for generating an output signal to disconnect said one asynchronous microprocessor means from access to said common memory means and to connect said another asynchronous microprocessor means for access to said common memory means for said predetermined limited period of time.

19. A controller for a printer apparatus according to claim 18 wherein said predetermined signal to which said second circuit means is responsive is generated by a second flip flop means in response to any microprocessor means contending for access to said common memory means.

20. A controller for a printer apparatus according to claim 19 wherein said second circuit means for initiating said adjustment in timing of an asynchronous microprocessor means contending for access to said common memory means includes shift register means connected to be responsive to said predetermined signal.

* * * * *